(12) United States Patent
Hayden

(10) Patent No.: US 6,533,053 B2
(45) Date of Patent: Mar. 18, 2003

(54) QUICK DETACHABLE DRIVE SHAFT

(75) Inventor: Stephan R. Hayden, Madison, WI (US)

(73) Assignee: Deere & Company, Moline, IL (US)

( * ) Notice: Subject to any disclaimer, the term of this patent is extended or adjusted under 35 U.S.C. 154(b) by 56 days.

(21) Appl. No.: 09/924,640

(22) Filed: Aug. 8, 2001

(65) Prior Publication Data

US 2003/0029666 A1 Feb. 13, 2003

(51) Int. Cl.[7] ............................................... B60K 25/00
(52) U.S. Cl. ......................................... 180/53.7; 74/11
(58) Field of Search ........................... 180/53.6, 53.62, 180/53.7, 379, 53.1; 74/11, 15.6

(56) References Cited

U.S. PATENT DOCUMENTS

| | | | | |
|---|---|---|---|---|
| 1,317,084 A | * | 9/1919 | Klima ........................ | 180/53.7 |
| 1,538,881 A | * | 5/1925 | Barton ....................... | 180/53.7 |
| 1,555,715 A | * | 9/1925 | Kominski ................... | 180/53.7 |
| 1,665,765 A | * | 4/1928 | Barton ....................... | 180/53.7 |
| 1,983,877 A | * | 12/1934 | Radford ...................... | 180/53.6 |
| 2,027,638 A | * | 1/1936 | Forsberg et al. ............... | 403/26 |
| 3,759,340 A | * | 9/1973 | Schilter ...................... | 180/53.7 |
| 3,847,415 A | * | 11/1974 | Geisthoff .................... | 172/272 |
| 4,517,855 A | * | 5/1985 | Lane et al. ................... | 74/528 |
| 4,621,699 A | * | 11/1986 | Slazas ........................ | 180/53.7 |
| 4,763,744 A | * | 8/1988 | McVicar et al. ........... | 180/53.7 |
| 5,469,931 A | * | 11/1995 | Kawata et al. .............. | 180/379 |
| 5,522,669 A | * | 6/1996 | Recker ........................ | 403/328 |
| 5,667,330 A | * | 9/1997 | Henkel et al. .............. | 403/328 |
| 6,237,708 B1 | | 5/2001 | Kawada | |

OTHER PUBLICATIONS

Meeting Customer Needs, Product Services Information Installation Instructions John Deere Horicon Works—(Feb. 10, 1997).

* cited by examiner

*Primary Examiner*—Paul N. Dickson
*Assistant Examiner*—Laura B. Rosenberg

(57) ABSTRACT

A quick detachable drive shaft for use with lawn tractors having a rearward end mounted to a power source and a forward end supported by a bearing detachably mounted to a plate that is detachably connected to a bracket on the tractor with a latch that maintains the plate in connection with the bracket in a first position and releases the plate from the bracket in second position.

5 Claims, 6 Drawing Sheets

QUICK DETACHABLE DRIVE SHAFT

BACKGROUND OF THE INVENTION

1) Field of the Invention

The present invention relates generally to a detachable drive shaft and, more specifically, to a detachable power take off drive shaft for a lawn and garden tractor.

2) Related Art

Lawn and garden equipment that utilize powered front attachments require a PTO shaft that extends forwardly of the lawn tractor. Lawn tractors having PTO shafts that extend forwardly of the tractor are known in the art, however, when the mower deck is in use, these PTO shafts must be removed. One device in particular has a shaft with a detachable feature that includes a hex shaft that is allowed to slide out of its retaining bearing during removal. These shafts, however, are difficult to remove and require the use of tools. Also, the shafts are likely to be jammed by both dirt and rust. Therefore, there exists a need for a quick detachable device that is easy to remove and does not require the use of tools.

BRIEF SUMMARY OF THE INVENTION

It is therefore an objective of the present invention to provide a quick detachable device that allows for the removal of the drive shaft without tools.

It is a further objective of the invention to provide a detachable device that allows the drive shaft to be easily removed.

A further objective of the present invention is to provide a detachable device to allow the removal of a drive shaft that is easy to manufacture having a minimum of machined parts.

In accordance with the above objectives, the detachable device of the present invention has a drive shaft with forward and rearward ends. The rearward end is supported by a U-joint operatively mounted to a transaxle output shaft of a lawn tractor. The forward end of the drive shaft is supported by a bearing that is mounted to a means for detaching the shaft from a bracket connected to the forward end of the tractor for removal of the shaft. The means for detaching the shaft has a plate that is detachably connected to the bracket and a latch that is connected to the bracket that maintains the plate in connection with the bracket in a first position and releases the plate from the bracket in a second position.

These and other objectives, features and advantages of the present invention will become apparent to one skilled in the art upon reading the following detailed description in view of the drawings.

DETAILED DESCRIPTION OF THE INVENTION

Figure 1:
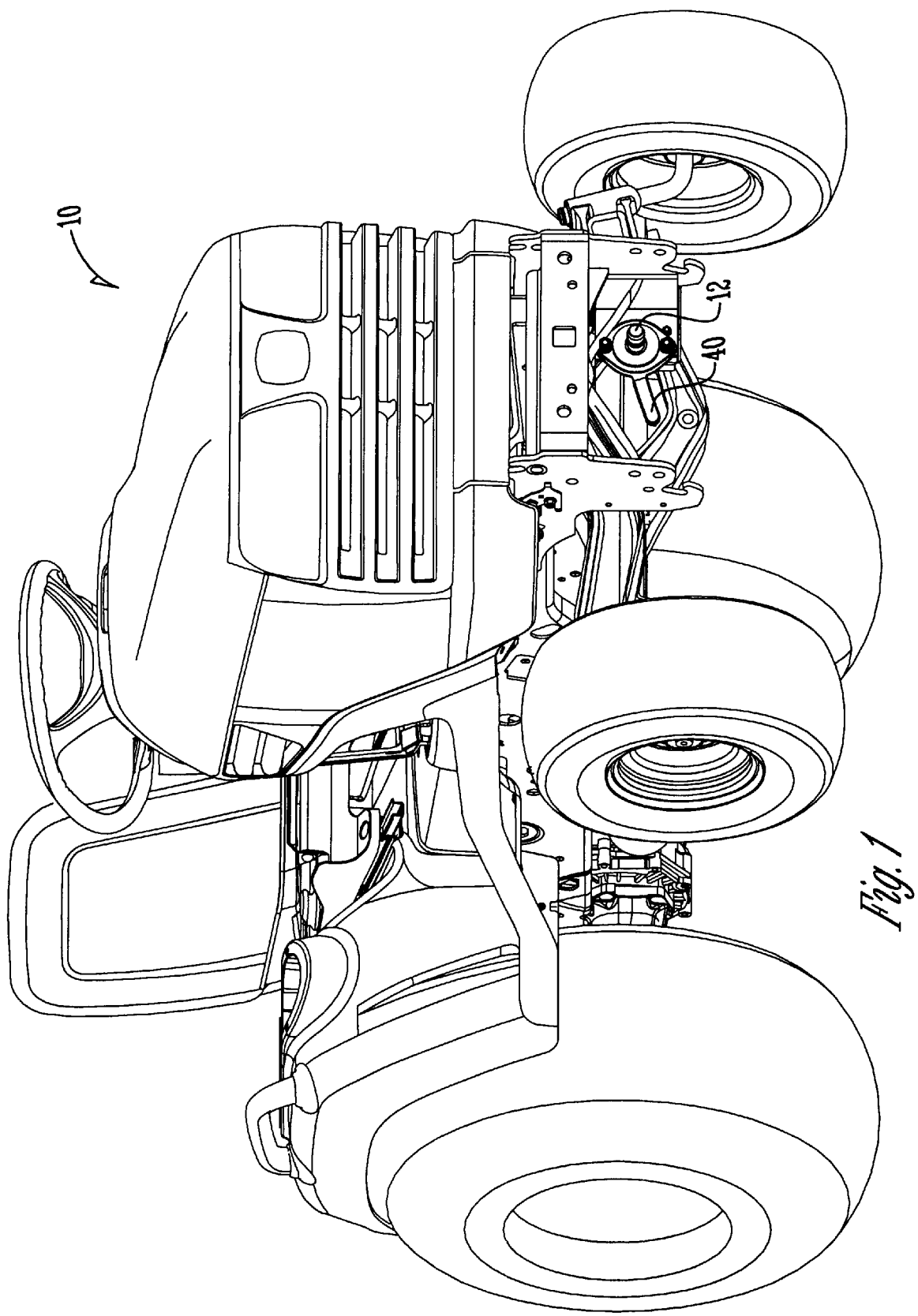
FIG. 1 is a perspective view of the invention extending from the front end of a lawn tractor.
Figure 2:
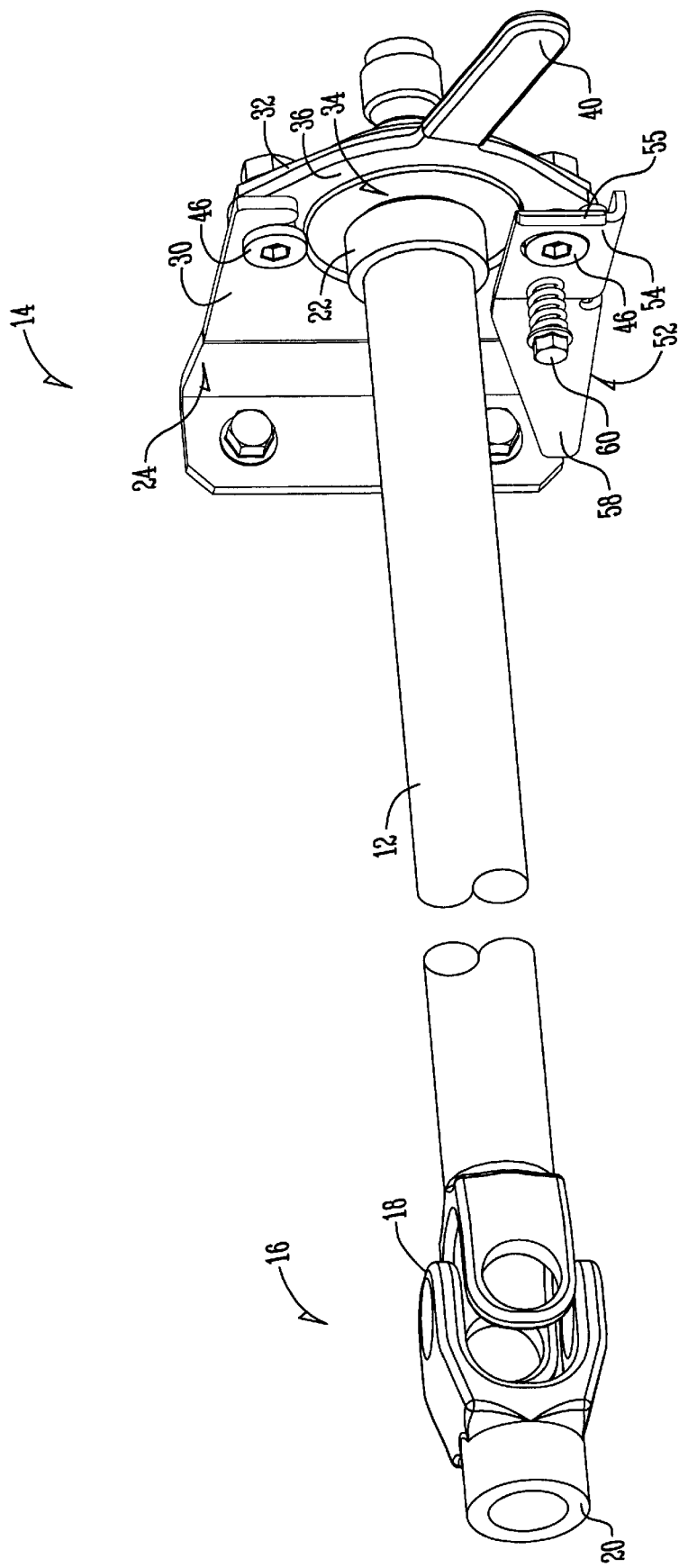
FIG. 2 is a rear side perspective view of the invention.

Referring now to the drawings and particular FIG. 1, therein is shown a lawn tractor 10. Extending between the forward and rearward ends of the lawn tractor 10 is a PTO drive shaft 12 with a forward end 14 and a rearward end 16. As best shown in FIG. 2 the rearward end is supported by a U-joint 18 that is operatively mounted to a transaxle output shaft connector 20.

Figure 3:
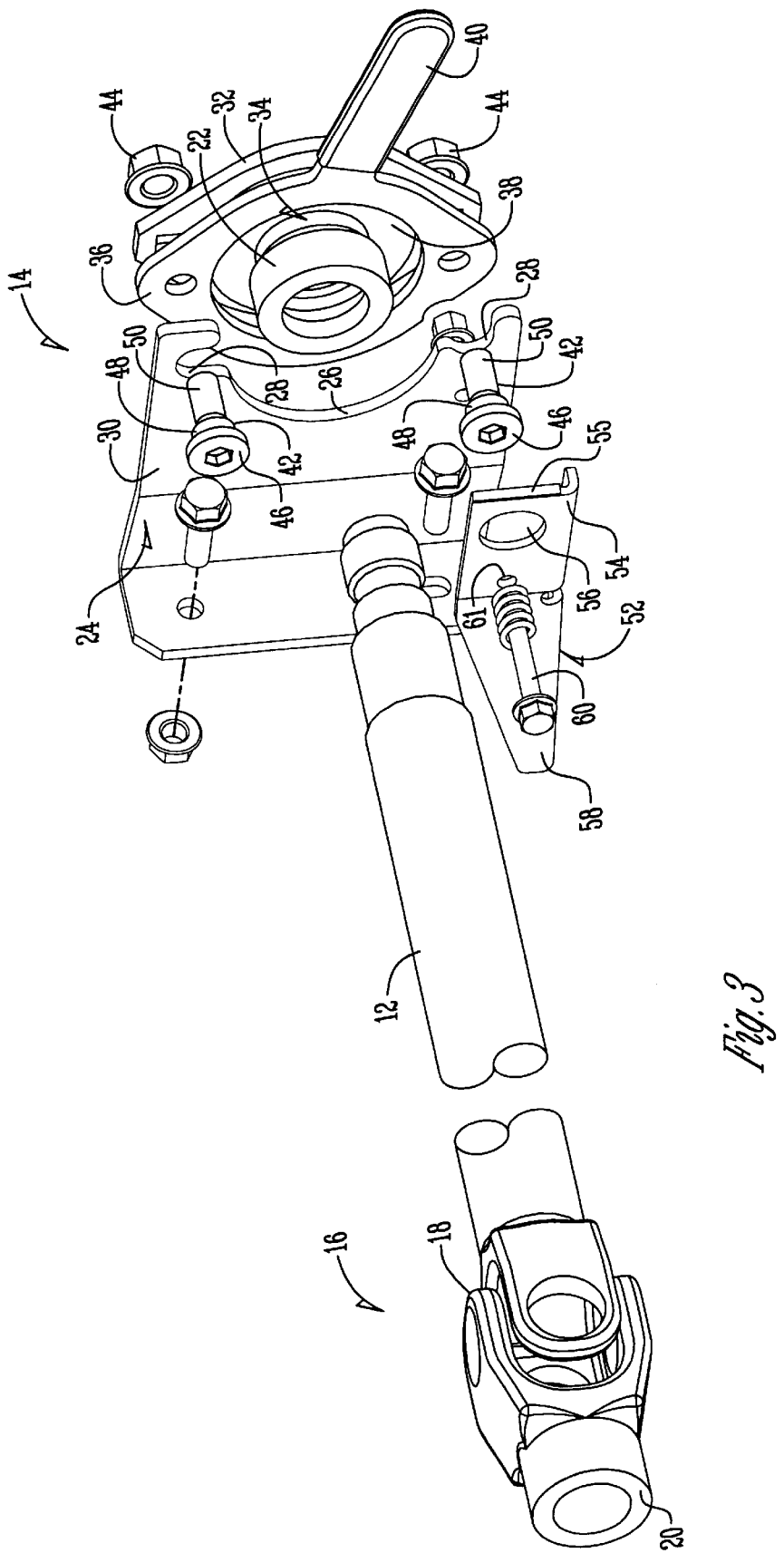
FIG. 3 is an exploded rear side perspective view of the invention.

The forward end 14 is supported by a bearing locking collar 22 that is mounted to a means for detaching the shaft 12 from a bracket 24 to allow removal of the shaft. The bracket 24 is generally L-shaped with a semi-circular notch 26 and receiving notches 28 positioned in respective shoulders 30 of the bracket 24. (See FIGS. 3 and 4).

A bearing flangette 32 is secured to bearing 34. Connected to the flangette 32 is a plate 36 with a central opening 38 and a handle 40. Flangette 32 and plate 36 are connected by shoulder bolts 42 and nuts 44. The shoulder bolts 42 have a head 46, a shoulder portion 48 and a stem 50.

Figure 4:
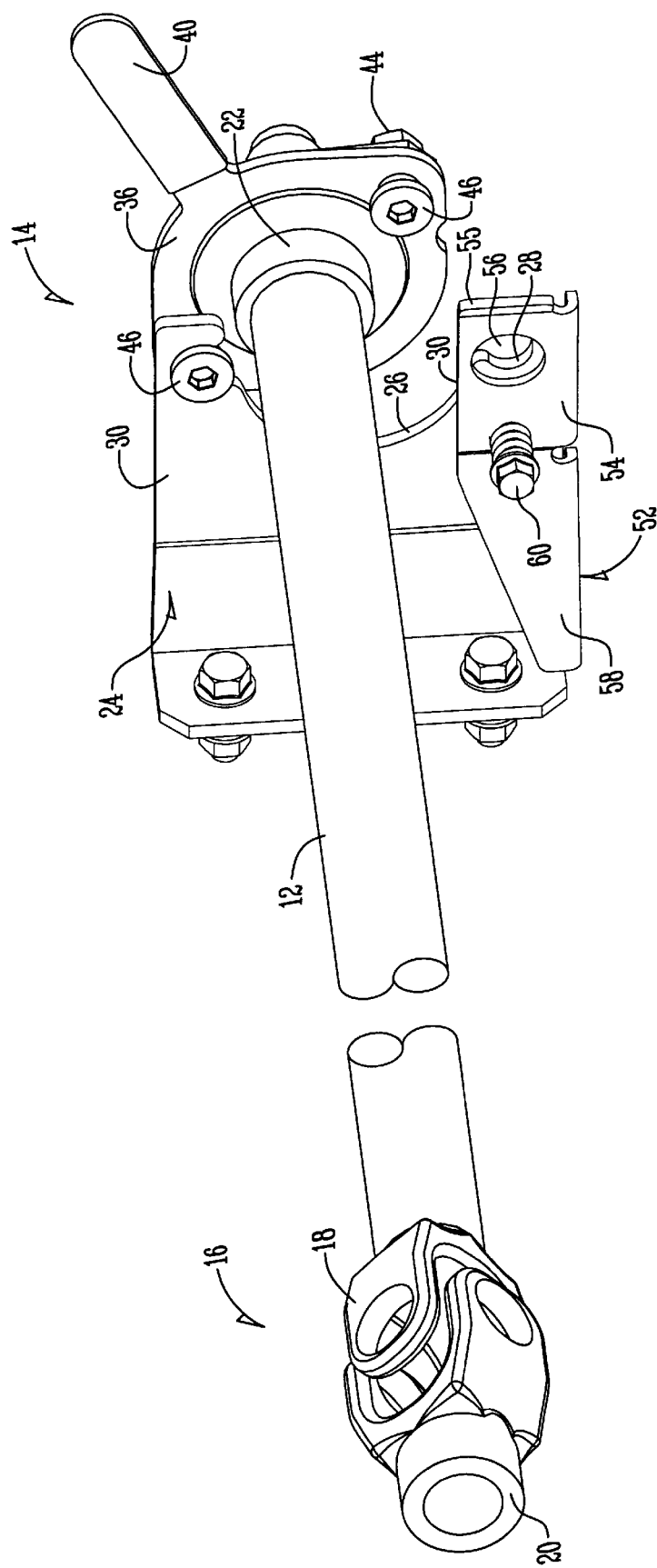
FIG. 4 is an enlarged rear side perspective view of the invention.
Figure 5:
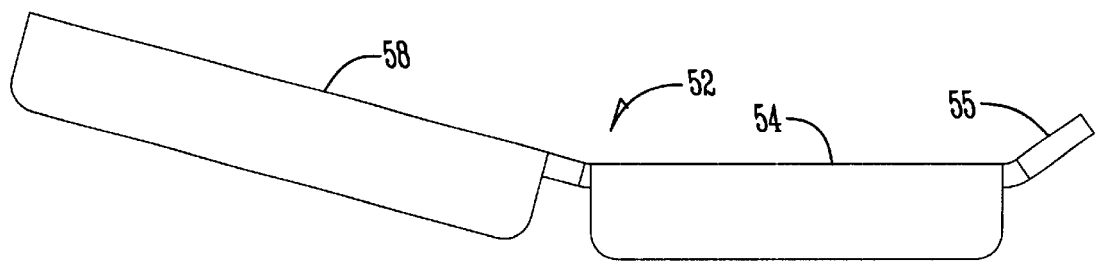
FIG. 5 is an enlarged scale bottom plan view of a latch element of the invention.
Figure 6:
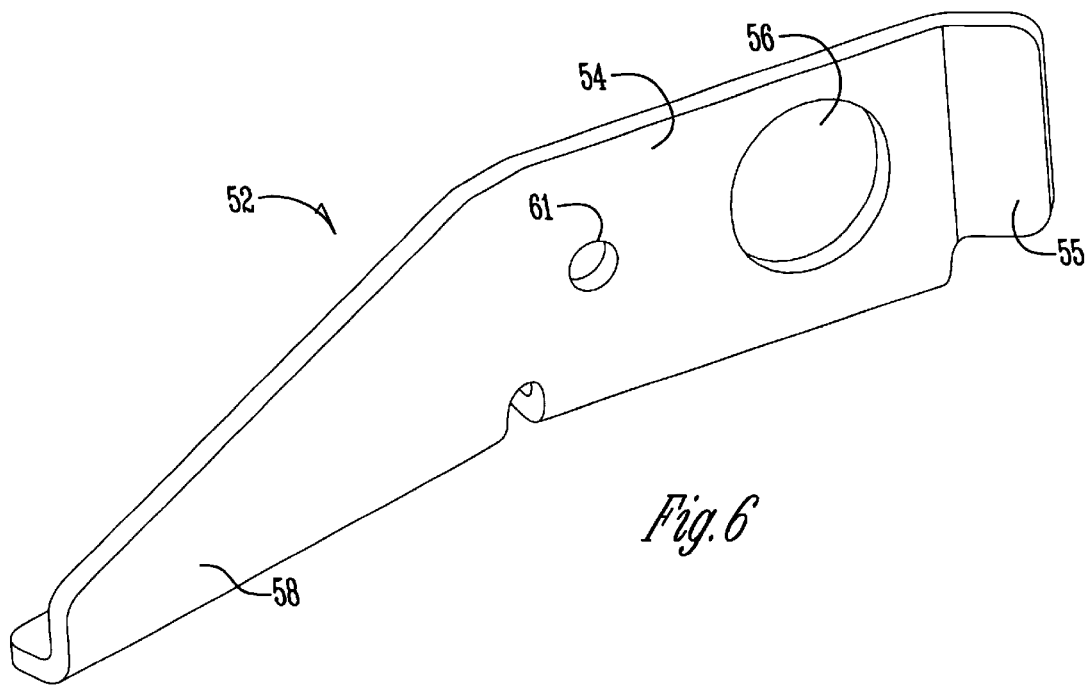
FIG. 6 is an enlarged scale perspective view of the latch as seen generally from the side of the latch appearing in FIG. 4.
Figure 7:
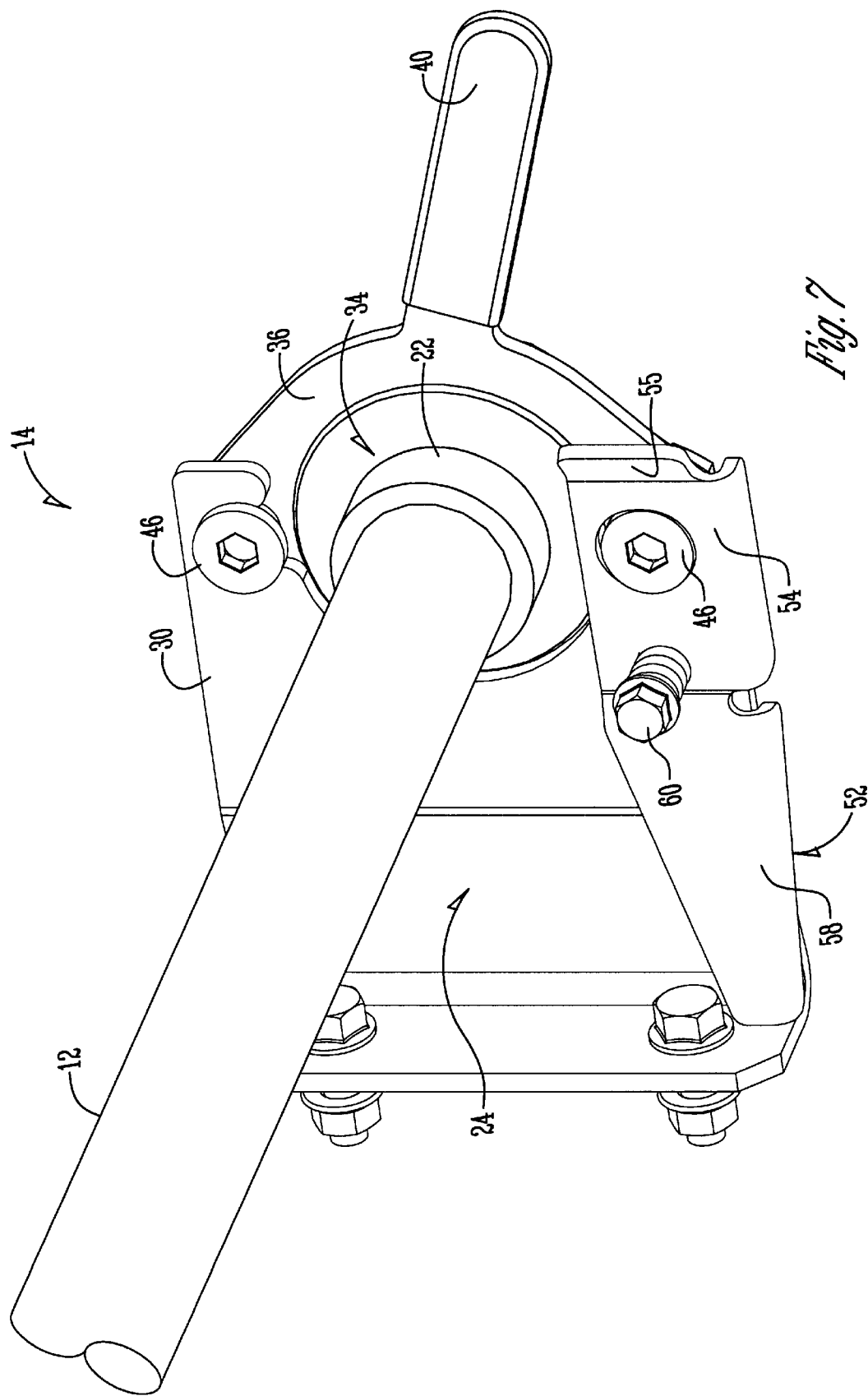
FIG. 7 is an enlarged scale perspective view of the mounting structure at the forward end of the drive shaft as viewed generally from below FIG. 4.

A latch 52 having a first flange 54 with a bore 56 therethrough and a second flange 58 that extends outwardly from the bracket 24 are connected to the lower shoulder of the bracket with a spring loaded pin 60. An end portion of flange 54 is bent in a direction toward bore 56 to form a flange 55 (FIGS. 5 and 6) forming an angle of about 20° with flange 54. Engagement of bolt 42 with flange 55 forces or tilts flange 54 outwardly to the left as seen in FIG. 4 to assist in the latching operation. As soon as bolt 42 clears flange 55, latch 52 snaps back into position of FIG. 2 and bolt 42 snaps into opening 56 of flange 54.

When assembled, the shoulder bolts 42 that connect the flangette 32 and plate 36 fit within receiving notches 28 of the bracket 24. The first flange 54 of latch 52 receives the lower head 46 of the shoulder bolt 42 within bore 56. The spring loaded pin 60 extending through aperature 61 for connection to bracket 24 maintains the first flange 54 in a position where head 46 of shoulder bolt 42 is received within bore 56 as shown in FIG. 2. In this position the latch 52 maintains plate 36 in connection with the bracket 24. The handle 40 is used to move the component from the position of FIG. 2 to the position of FIG. 4, and vice versa.

To remove the drive shaft, force is exerted on the second flange 58 of latch 52 such that the latch pivots about the spring loaded pin and the second flange 58 moves outwardly from bracket 24 as best shown in FIG. 4. When the latch is in this position it releases the plate 36 from the bracket 24 allowing one to remove the shaft from the bracket and then to pull forwardly to slideably disengage the U-joint 18 of the transaxle output shaft connector 20 from the source of rotational power (not shown) on the tractor. As is shown from this description, the removal of the drive shaft is done from the front of the tractor and does not require the use of tools. This invention eliminates the need to pull back on a locking collar on the U-joint 18 which is located on the transaxle output shaft to remove the shaft. Thus, the present invention accomplishes the objectives of providing a device to easily remove a drive shaft without tools that is made of a minimum number of machined parts.

Having described the preferred embodiment, it will become apparent that various modifications can be made without departing from the scope of the invention as defined in the accompanying claims.

What is claimed is:

1. A detachable forwardly extending power take-off shaft on a lawn tractor having a source of rotational power, comprising;
   a tractor having forward and rearward ends;
   a drive shaft with forward and rearward ends mounted longitudinally on the tractor and being co-extensive therewith;
   the rearward end of the shaft being slidably detachably connected to a rotational power means on the rearward end of the tractor;
   a bracket on the forward end of the tractor;
   the forward end of the shaft supported by a bearing detachably mounted on the bracket;
   a means for detaching the shaft from the bracket including a latch connected to the bracket that maintains the shaft in operative condition on the bracket in a first position, and releases the shaft from the bracket in a second position.

2. The device of claim 1 wherein the bearing includes a handle for movement of the bearing toward or away from the bracket.

3. The device of claim 1 wherein the latch also includes a movable and tiltable locking mechanism which locks the bearing to the bracket in a first tilted position, and releases the bearing from the bracket in a second tilted position.

4. The device of claim 3 wherein the tiltable locking mechanism is spring loaded in one of its tiltable positions.

5. The device of claim 1 wherein a bearing flangette plate is secured to the bearing, and the bearing flangette plate is detachably secured to the bracket.

* * * * *